United States Patent Office 3,830,942
Patented Aug. 20, 1974

3,830,942
NON-ISOELECTRIC PROTEIN
Robert L. Hawley, Webster Groves, Mo., assignor to Ralston Purina Company, St. Louis, Mo.
No Drawing. Filed Aug. 13, 1970, Ser. No. 63,631
Int. Cl. A23l 1/00; A21d 2/26; A23j 3/00
U.S. Cl. 426—190
15 Claims

ABSTRACT OF THE DISCLOSURE

A soluble protein product for use in foodstuffs and particularly for use in highly acid foods is produced from oleaginous seed materials. In addition, an insoluble protein product for use in foodstuffs is obtained from the same process. The properties of these products are obtained by placing protein containing materials in a solution having a specified pH at or about the isoelectric point and under controlled conditions effecting enzyme digestion of the protein. The material is then heated to inactivate the enzyme and the digested and undigested protein portions separately dried. These two dried fractions produce the desired products of the invention. The soluble protein product may be used to produce protein enriched food products and is particularly desirable for use in drinks at acidity levels below approximately pH 4.6 since said protein product is very soluble, has good stability in high acid foods and does not tend to gel or curdle. The insoluble protein product may be used to produce protein enriched food products and is particularly desirable for use in bakery goods since the product is in the form of inert protein which does not react or undesirably bind the water of such products.

BACKGROUND OF THE INVENTION

The art is familiar with currently available high protein products which are employed in producing protein enriched food products. Such products are desirable in the sense that they provide a readily available source of protein; however, such protein products cannot be readily employed in foods or drinks at acidity levels below pH 4.6 because when ingested, the protein is buffered to its isoelectric point and curdles in the mouth. This curdling produces an unsatisfactory mouthfeel. If untreated protein products were to be employed in food products such as acidic beverages and the like, the resulting product would contain a fine suspension of the protein material wherein the proteins have limited stability and tend to gel or settle on standing. This would tend to detract from the physical appearance of such a product. Therefore, it would appear to be highly desirable to provide a concentrated source of edible protein which would be readily soluble in specified mediums to produce protein enriched food products which are also physically attractive, e.g. protein enriched acidic beverages, soft drinks and the like.

Also, the use of protein products in bakery goods is somewhat limited due to the nature of these protein products to undesirably bind the water in the bakery goods resulting in an unpleasing texture. As a result the use of such protein products in bakery goods has been very limited. Therefore, it would appear to be highly desirable to provide an insoluble protein product for use in producing protein enriched food products without affecting the texture thereof by undesirably binding the water, e.g. protein enriched bakery goods.

SUMMARY OF THE INVENTION

The invention involves a method for producing protein products which comprises the steps of forming an aqueous slurry containing defatted oleaginous seed materials, adjusting the pH of the aqueous slurry to approximately the isoelectric point of the oleaginous seed materials, heating said aqueous slurry to elevated temperatures, adding a predetermined amount of enzyme to the aqueous slurry, agitating the mixture during digestion of the protein material and thereafter separating the undigested protein from the digested protein. The digested protein material may be dried or concentrated to produce a soluble protein product which is very useful in acidic foods and particularly acidic beverages. The undigested protein material is dried in an oven and then ground to produce an insoluble protein product which is particularly useful in preparing protein enriched bakery goods.

DESCRIPTION OF THE PREFERRED EMBODIMENTS

The present invention will be described in terms of using soybeans as the vegetable protein source. However, it should be understood that other vegetable materials such as cottonseed, sesame, sunflower, safflower, peanuts, and the like could be used to prepare the protein products by the subject invention. In addition, the protein material utilized in practicing the present invention may be in the form of meal, a protein concentrate or a protein isolate. These protein materials are well known in the prior art and readily available either in a dry form or in the form of a curd or slurry. Since the procedure for preparing a concentrate or isolate is well known and these materials may be readily obtained, the present invention will be described as practiced on soy protein isolate, it being understood that the same conditions would apply if soy protein or soy meal were to be utilized.

The present invention is prepared by initially forming an aqueous slurry of the vegetable protein or soy protein isolate material and water. The soy protein isolate material should constitute between 5% and 40% of the aqueous slurry mixture and preferably between 10% and 20%. It should be realized that the selection of the water/soy protein isolate material ratio in the aqueous slurry will be dependent upon many factors, such as pumping costs, heating costs, the particular enzyme used, and operator preference; however, it has been found that an optimum ratio is about 85% water and 15% soy protein isolate material. The pH of the aqueous slurry, if not at the isoelectric point, should then be adjusted to approximately the isoelectric point of the vegetable protein utilized. This is accomplished by adding materials such as inorganic or organic acids, e.g. hydrochloric acid, sulfuric acid, phosphoric acid, acetic acid, lactic acid or other pH lowering materials such as sulfur dioxide. The criticality of this step is to adjust the pH of the slurry to as near the isoelectric point of the material as is possible. It should be realized that the pH for the isoelectric point will be dependent on the particular vegetable protein material being treated, as an example, the pH for the isoelectric point of soy protein is approximately 4.6.

After the pH adjustment to the isoelectric point, the aqueous slurry is subjected to heat so as to raise the temperature to a range between about 90–160° F. This heating step is utilized to raise the aqueous slurry to a temperature at which the enzyme will be most active in digesting the protein contained in the aqueous slurry. Alternatively, the aqueous protein slurry may be heated to a temperature above that at which the proteolytic enzyme is active and subsequently cooled to the range of enzyme activity. This heating step may be performed before or after the pH adjustment. The aqueous protein slurry, if the heating step were employed, would be heated to a temperature of between about 180° and 250° F., preferably about 210° F. for a time of between about 2 and 30 minutes. The heating step prior to enzymatic digestion may render the protein more susceptible to the action of the enzymes. The aqueous slurry would then be cooled to between about 90–160° F., the pH would be adjusted to about the isoelectric point; if necessary, the proteolytic enzyme would be added, and the digestion would be carried out as described herein.

An enzyme which is effective in a pH range at or about the isoelectric point of the material is added to the aqueous slurry. Any enzyme effective in this pH range may be utilized, some of which are papain, ficin, bromelin, fungal protease and bacterial proteases. I have discovered that a number of bacterial and fungal proteases are very useful in the process of the present invention, in particular, enzymes produced by bacteria of *Bacillus subtilis* species have proven to be quite useful. Fungal enzymes produced by *Aspergillus oryzae* have also proven to be highly useful. The concentration of the particular enzyme utilized will be dependent upon the speed with which the digestion process is to be carried out. By this is meant the greater the concentration of enzyme added to the aqueous slurry, the faster the digestion will proceed, and the smaller the amount of enzyme added the more slowly the digestion will progress. Therefore, it will be dependent upon operating conditions and operator's preference as to the quantity of the particular enzyme which should be used. After the enzyme has been added to the aqueous slurry, the mixture is then subjected to mild agitation to prevent the settling out or stratification of the various protein ingredients contained in the slurry. As an example of this enzyme digestion procedure, it has been found that when 0.5% by weight papain (dry protein basis) is added to aqueous slurry at 150° F. the digestion will be accomplished within about 3 to 5 hours; normally the digestion will be complete in approximately 4 hours. The enzyme will usually be added to the digestion mixture at a level of from about 0.3 to 0.5% by weight of the protein on a dry basis. Digestion times will depend on the particular enzyme employed, the digestion temperature, the concentration of protein in the aqueous slurry, and the concentration and strength of the enzyme employed. The digestion will typically be completed within 3 to 5 hours or less. The acid soluble material recovered from the digestion should be hydrolyzed to the point where it will flow freely through a No. 4 Whatman qualitative filter paper in a Büchner funnel under vacuum.

Additional reagent chemicals may also be added to the aqueous mixture to modify the properties of resulting protein or to increase the rate of the proteolytic digestion. I have discovered that small amounts of sodium bisulfate and/or sodium carbonate will increase the yield of acid soluble protein recovered from the digestion mixture when used with some proteolytic enzymes, particularly papain. The sodium bisulfite and/or sodium carbonate will usually be added in very small amounts, such as about 0.1% or less of the protein on a dry basis. When added in this amount, the reagents may increase the yield of acid soluble protein by as much as 5% of the total protein in the digestion mixture.

After the digestion is completed, the temperature of the slurry should then be raised to a point which will serve to inhibit further enzymatic activity. Again, this temperature will be dependent upon the particular enzyme being utilized in the digestion process and the inhibiting temperature for any particular enzyme is well known in the art. Generally, a temperature above 210° F. is satisfactory to inhibit the activity of the enzymes in the digestion mixture. I have found that the activity of the proteolytic enzymes may be satisfactorily inhibited by heating the digestion slurry to a temperature of 210° F. for 10–15 minutes.

After the enzyme digestion, the slurry consists of two distinct portions, one being the digested protein material and the other being the undigested residue. These two portions are then separated either by centrifugation or by filtration. If desired, the undigested residue may be subjected to a water wash and then recentrifuged to attain the most effective separation of the digested protein from the undigested residue. This process yields digested protein in the range of approximately 40–60% and undigested protein in the range of approximately 40–60%, though the yield ratio can be varied somewhat if a greater proportion of a particular protein product is desired. These yield percentages will depend on whether the slurry is subjected to centrifugation or filtering and also will be dependent on the number of water washes to which the undigested residue is subjected. Typically, the yield from this process is approximately 55% as digested protein and 45% as undigested protein.

The digested protein is then dried and preferably should be concentrated such as in a vacuum evaporator to approximately 50% solids and then spray dried. The resulting protein product is highly soluble and may be utilized in acidic foods or foods prepared in the pH range of the isoelectric point without the usual problems of the protein tending to gel or curdle in such products. This product is particularly useful in carbonated beverages which are acid and below the isoelectric point of the protein. Even when such carbonated drinks are ingested and the material is buffered to the isoelectric point, the protein does not gel or curdle so that an undesirable mouthfeel is not experienced when ingesting such foods.

The undigested protein portion of the aqueous slurry is dried in an oven and then ground to form an insoluble protein product. This product is highly insoluble and may be utilized for protein fortification of bakery goods since it will not undesirably bind the water content of such foods to impart an undesirable texture thereto. This protein material may then be beneficially used as a protein source but does not inhibit or alter the other constituents of such products.

Although the inventive concepts will be readily understood from the above description, by one having ordinary skill in the art, the following examples are given to assure a complete understanding.

Example 1

A solution was formed consisting of 84.44% water and 15.48% isoelectric soy protein isolate. The protein isolate was dispersed into the water and the mixture was then heated to approximately 155° F. The pH of the mixture was 4.6. To this heated mixture was added to 0.08% papain enzyme (Pfizer P6) on a wet basis (0.5% on a dry protein basis). The mixture was agitated slowly for 4 hours. The mixture was then heated to 210 F. for 10 minutes to inhibit further enzyme activity. The undigested residue was then separated from the digested protein by centrifugation. The undigested residue was then washed with twice its weight of water and recentrifuged. The undigested residue was then dried in an oven at 180° F. for 4 hours and ground to form the insoluble protein product. The digested protein material and the wash water were combined and placed in a vacuum evaporator, concentrated to 50% solids and then sprayed dried to form the soluble protein product which will not precipitate at pH 4.6. The yield from this process was approximately 55% as the digested protein product and 45% as the undigested protein product.

Example 2

A solution was formed consisting of 90% water and 10% isoelectric soy protein isolate. The protein isolate was dispersed into the water and the mixture was then heated to approximately 210° F. The mixture was held at this temperature for about 5 minutes and then cooled to 130° F. The pH of the cooled mixture was 4.6. To the cooled mixture was added 0.03% ficin enzyme (Miles Laboratories) on a wet basis (0.3% on a dry protein basis). The mixture was agitated slowly for 5 hours. The mixture was then heated to 210° F. for 10 minutes to inhibit further enzyme activity. The undigested residue was then separated from the digested proten by centrifugation. The undigested residue was then washed with twice its weight of water and recentrifuged. The undigested residue was then dried in an oven at 150° F. for 12 hours and ground to form the insoluble protein product. The digested protein material and the wash water were placed in a vacuum evaporator, concentrated to 50% solids and then spray dried to form the soluble protein product which will not precipitate at pH 4.6. The yield from this process was approximately 34.0% as the digested protein product and 66.0% as the undigested protein product.

Example 3

A solution was formed consisting of 90% water and 10% isoelectric soy protein isolate. The protein isolate was dispersed into the water and the mixture was then heated to approximately 210° F. The mixture was held at this temperature for about 5 minutes and then cooled to 150° F. The pH of the mixture was 4.7 when cooled. To the cooled mixture was added 0.03% bromelin enzyme (Miles Laboratories) on a wet basis (0.3% on a dry protein basis). The mixture was agitated slowly for 4 hours. The mixture was then heated to 210° F. for 10 minutes to inhibit further enzyme activity. The undigested residue was then separated from the digested protein by centrifugation. The undigested residue was then washed with twice its weight of water and recentrifuged. The undigested residue was then dried in an oven at 180° F. for 5 hours and ground to form the insoluble protein product. The digested protein material and the wash water were placed in a vacuum evaporator, concentrated to 50% solids and then spray dried to form the soluble protein product which will not precipitate at pH 4.6. The yield from this process was approximately 43.2% as the digested protein product and 56.8% as the undigested protein product.

Example 4

A solution was formed consisting of 90% water and 10% isoelectric soy protein isolate. The protein isolate was dispersed into the water and the mixture was then heated to approximately 130° F. To this heated mixture was added 0.05% of a *Bacillus subtilis* enzyme (Miles Laboratories Takamine HT Proteolytic) on a wet basis (0.5% on a dry protein basis). The mixture was agitated slowly for 5 hours. The mixture was then heated to 210° F. for 10 minutes to inhibit further enzyme activity. The undigested residue was then separated from the digested protein by centrifugation. The undigested residue was then washed with twice its weight of water and recentrifuged. The undigested residue was then dried in an oven at 180° F. for 8 hours and ground to form the insoluble protein product. The digested protein material and the wash water were placed in a vacuum evaporator, concentrated to 50% solids and then spray dried to form the soluble protein product which will not precipitate at pH 4.6. The yield from this process was approximately 32% as the digested protein product and 68% as the undigested protein product.

Example 5

A solution was formed consisting of 90% water and 10% isoelectric soy protein isolate. The protein isolate was dispersed into the water and the mixture was then heated to approximately 130° F. To this heated mixture was added 0.05% of an *Aspergillus oryzae* enzyme (Miles Laboratories Takamine Fungal Protease) on a wet basis (0.5% on a dry protein basis). The mixture was agitated slowly for 5 hours. The mixture was then heated to 210° F. for 10 minutes to inhibit further enzyme activity. The undigested residue was then separated from the digested protein by centrifugation. The undigested residue was then washed with twice its weight of water and recentrifuged. The undigested residue was then dried in an oven at 180° F. for 8 hours and ground to form the insoluble protein product. The digested protein material and the wash water were placed in a vacuum evaporator, concentrated to 50% solids and then spray dried to form the soluble protein product which will not precipitate at pH 4.6. The yield from this process was approximately 26.1% as the digested protein product and 73.9% as the undigested protein product.

Example 6

A solution was formed consisting of 90% water and 10% isoelectric soy protein isolate. The protein isolate was dispersed into the water and the mixture was then heated to approximately 155° F. To this heated mixture was added 0.03% papain enzyme (Pfizer P6) on a wet basis (0.3% on a dry protein basis). One percent sodium carbonate (dry protein basis) was added and the mixture was agitated slowly for 5 hours. The mixture was then heated to 210° F. for 10 minutes to inhibit further enzyme activity. The undigested residue was then separated from the digested protein by centrifugation. The undigested residue was then washed with twice its weight of water and recentrifuged. The undigested residue was then dried in an oven at 190° F. for 7 hours and ground to form the insoluble protein product. The digested protein material and the wash water were placed in a vacuum evaporator, concentrated to 50% solids and then spray dried to form the soluble protein product which will not precipitate at pH 4.6. The yield from this process was approximately 52.0% as the digested protein product and 48.0% as the undigested protein product.

Example 7

A solution was formed consisting of 90% water and 10% isoelectric soy protein isolate. The protein isolate was dispersed into the water and the mixture was then heated to approximately 155° F. To this heated mixture was added 0.03% papain enzyme (Pfizer P6) on a wet basis (0.3% on a dry protein basis). One percent sodium bisulfite (dry protein basis) was added and the mixture was agitated slowly for 5 hours. The mixture was then heated to 210° F. for 10 minutes to inhibit further enzyme activity. The undigested residue was then separated from the digested protein by centrifugation. The undigested residue was then washed with twice its weight of water and recentrifuged. The undigested residue was then dried in an oven at 180° F. for 7 hours and ground to form the insoluble protein product. The digested protein material and the wash water were placed in a vacuum evaporator, concentrated to 50% solids and then spray dried to form the soluble protein product which will not precipitate at pH 4.6. The yield from this process was approximately 53.2% as the digested protein product and 46.8% as the undigested protein product.

The products produced by the method of this invention may be used to produce a wide variety of useful protein enriched foods due to the highly desirable nutritional and functional properties of the products. The digested protein product is highly soluble in acid solutions and will not curdle or coagulate out of solutions due to buffering out of the solution to the normal isoelectric point of protein. This property makes the digested product a desirable component in carbonated soft drinks, particularly where the pH of the drink is below the normal isoelectric point of protein.

Example 8

A protein fortified soft drink was prepared using the dried digested product produced in Example 1 using the following formulation:

| | Percent |
|---|---|
| Warner Jenkinson #955 orange flavored bottler's syrup | 17.60 |
| Carbonated water (2 volumes $CO_2$/volume $H_2O$) | 80.63 |
| Example 1 soluble digested protein (56% protein/44% $H_2O$) | 1.76 |
| | 100.00 |

The syrup and protein solutions were mixed and filled into a bottle. Carbonated water was injected into the bottle and the filled bottle was immediately capped. The drink product had a pH of 4.0. The product exhibited a clear orange flavor and a smooth mouthfeel. There was no graininess in the mouth and no bitter or beany protein flavor or aftertaste.

The undigested protein product is also useful due to its property of being highly insoluble. It can be added as protein fortification to a wide variety of products at high levels without producing gumminess or excessively binding the water in the product.

Example 9

A protein fortified cookie product was prepared using the dried undigested product produced in Example 1 by using:

| | Percent |
|---|---|
| Margarine | 18.0 |
| Insoluble protein of Example 1 | 15.0 |
| Whole egg | 10.0 |
| Flour | 25.0 |
| Brown sugar | 21.0 |
| Molasses | 9.0 |
| Baking soda | 0.3 |
| Cloves | 0.1 |
| Ginger | 0.4 |
| Cinnamon | 0.3 |
| Salt | 0.9 |
| | 100.0 |

The margarine, egg, brown sugar, and molasses were blended together to form a creamy mix. The remaining dry ingredients were mixed separately and then blended with the creamy mix. The combined dough was then dropped on a cookie sheet, flattened, to form cookies approximately two inches in diameter and baked at 350° F. for 5 to 6 minutes. The baked cookies resembled ordinary ginger cookies in flavor; they were short and crisp with a good flavor. The cookies were not soggy or unduly moist.

Additional uses of the products and processes of this invention to produce food products and in the food and protein arts will be apparent to one skilled in the art.

I claim:

1. A process for treating isolated soy protein comprising the steps of: forming an aqueous slurry of the isolated soy protein, adjusting the pH of the slurry to approximately 4.6, the isoelectric point of the soy protein, adding a proteolytic enzyme to the aqueous slurry, enzymatically digesting a portion of the soy protein at approximately the isoelectric pH and thereafter separating the digested portion from the undigested portion of the protein slurry.

2. The process according to Claim 1 including the step of spray drying the digested protein portion.

3. The process according to Claim 2 including the step of concentrating the digested protein portion to approximately 50% solids prior to spray drying.

4. The process according to Claim 1 including the steps of drying and then grinding said undigested protein portion.

5. The process according to Claim 1 wherein the proteolytic enzyme is selected from the group consisting of papain, ficin, bromelin, fungal protease and bacterial protease.

6. The process according to Claim 1 including the step of heating the slurry prior to adding the proteolytic enzyme material to rapidly effect the enzyme digestion of the soy protein.

7. The process of Claim 6 wherein said heating is to between about 90° to 160° F.

8. The process of Claim 1 wherein the aqueous slurry is heated to a temperature above about 200 °F. to inhibit the activity of the proteolytic enzymes following said enzymatic digestion.

9. The process of Claim 1 wherein the aqueous slurry is digested to the point where it will pass smoothly through a No. 4 Whatman qualitative filter paper in a Büchner funnel under vacuum.

10. An acid soluble digested soy protein product capable of passing through a number 4 qualitative filter paper in a Büchner funnel under vacuum in an aqueous suspension and being soluble at the normal isoelectric point of 4.6 produced by the method of claim 1.

11. An acidic beverage material having a pH below 4.6 containing the acid soluble non-isoelectric proteinic material of Claim 10.

12. A process for treating a soy protein isolate comprising the steps of: forming an aqueous slurry of the soy protein isolate, heating the aqueous slurry, adjusting the pH of the slurry to the isoelectric point of soy protein of approximately 4.6, adding a proteolytic enzyme material to the aqueous slurry, agitating the enzyme treated slurry, and enzymatically digesting a portion of the soy protein at the isoelectric point, and thereafter separating the undigested protein portion from the digested protein portion of the slurry.

13. The method of Claim 12 wherein the aqueous slurry is heated to a temperature of between 180° and 250° F. for between 2 and 30 minutes and then cooled to between 90° and 160° F. before the proteolytic enzyme is added.

14. The method of Claim 12 wherein the proteolytic enzyme is selected from the group consisting of papain, ficin, bromelin, fungal protease and bacterial protease.

15. The method of Claim 12 wherein the aqueous slurry is enzymatically hydrolyzed for between about 3 and 5 hours.

References Cited

UNITED STATES PATENTS

| 2,502,482 | 4/1950 | Sair et al. | 99—14 |
| 2,676,888 | 4/1954 | Westfall | 99—17 |
| 3,260,606 | 7/1966 | Azuma et al. | 99—113 |
| 3,127,388 | 3/1964 | Johnson et al. | 260—123.5 |
| 3,640,725 | 2/1972 | Sherba et al | 99—98 |

OTHER REFERENCES

Olikonis, Justin, "Those New Soy Proteins" *Food Engineering*, April 1959, pp. 104–105.

Ziemba, John, Let Soy Proteins Work Wonders for You, *Food Engineering*, May 1966, pp. 82–84, 87–90 and 93.

Johnson et al., *Cereal Chem.*, v. 25, pp. 77–87, 1948.

Abdo et al., *J. Agr. and Food Chem.*, vol. 15, pp. 83–7, 1967.

A. LOUIS MONACELL, Primary Examiner

J. R. HOFFMAN, Assistant Examiner

U.S. Cl. X.R.

195—5; 260—123.5; 426—46, 212